UNITED STATES PATENT OFFICE.

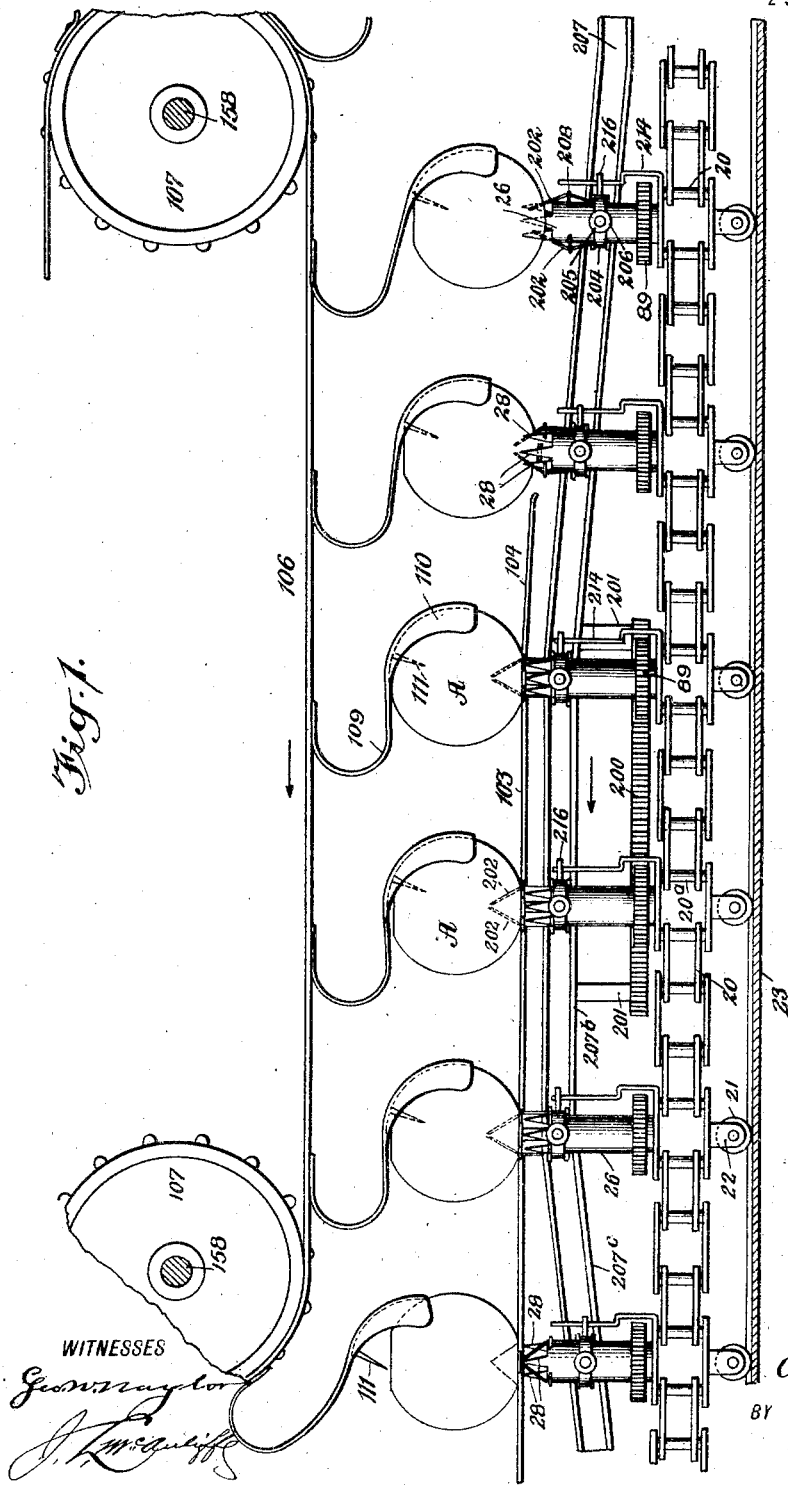

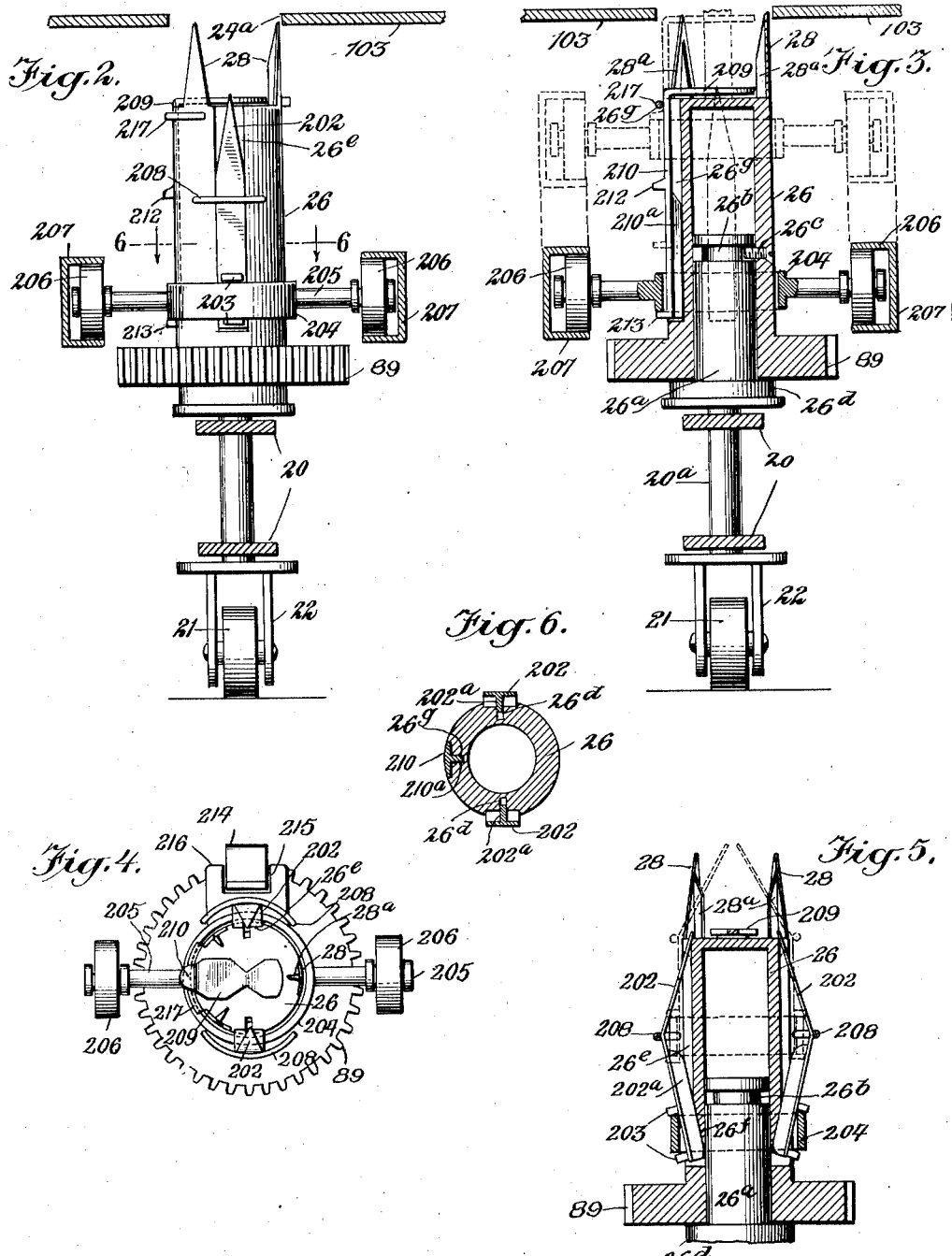

CHARLES KIRINO, OF OGDEN, UTAH.

CORING MEANS FOR TOMATO-PEELING MACHINES.

1,366,188.  Specification of Letters Patent.  Patented Jan. 18, 1921.

Application filed May 20, 1920. Serial No. 382,897.

*To all whom it may concern:*

Be it known that I, CHARLES KIRINO, a subject of the Emperor of Japan, and a resident of Ogden, in the county of Weber and State of Utah, have invented a new and Improved Coring Means for Tomato-Peeling Machines, of which the following is a description.

My invention relates to a machine for peeling tomatoes, and the present invention is designed more particularly as an improvement on the machine forming the subject matter of United States Patent No. 1,312,322 granted to me August 5, 1919 and forming the subject matter of an application for patent filed by me January 28, 1920, Serial No. 354,639.

In the tomato peeling machine referred to and particularly that forming the subject of my mentioned application, tomatoes, after the skins are removed are subjected to the action of a coring device and the peeled and cored tomatoes directed to a discharge chute leading laterally outward from the machine for the escape of the tomatoes.

The present invention has reference particularly to the coring means and has for its general object to effect the step of coring the tomatoes by means embodied in the holders on which the tomatoes are impaled and carried about the machine, said means being arranged to be operated by coacting fixed means on the machine, whereby to eliminate the use of separate coring mechanism. The nature of the invention and its advantages will appear from the specific description following.

Reference is to be had to the accompanying drawings forming a part of this specification, it being understood that the drawings are merely illustrative of one example of the invention.

Figure 1 is a side elevation of those parts of the machine adjacent to the discharge thereof between the skin removing means (not shown) of the machines referred to and said discharge;

Fig. 2 is a side elevation of one of my improved holders embodying the coring devices and an ejector coöperating therewith;

Fig. 3 is a view similar to Fig. 2 but with parts in vertical section;

Fig. 4 is a plan view of the holder;

Fig. 5 is a fragmentary view similar to Fig. 3 but taken at right angles thereto; and Fig. 6 is a horizontal section on the line through the body of the holder and in a plane corresponding with the line 6—6, Fig. 2.

Those parts of the present invention corresponding with parts of the machine forming the subject matter of my patent and application above mentioned will be accordingly referred to hereinafter and will be differentiated from the new features and parts entering into the present invention.

In the machine in question a traveling chain is employed, running about the machine, said chain being here designated by the numeral 20. The chain has incorporated therein holders 26 on which the tomatoes A are impaled, said holders having rollers 21 turning in brackets 22 and running on the bed 23 of the machine as in the patent and application referred to. Each holder 26 in the present invention is of tubular form turnable on a spindle $26^a$ rigid with vertical elements $20^a$ entering into said chain links. Said spindle has an annular groove $26^b$ in which there is accommodated the inner end of a screw $26^c$ that extends laterally through the tubular body of the holder. The bottom of the holder is in the form of a pinion 89 resting on an annular flange or collar $26^d$ at the base of the spindle. At the top the revoluble holder 26 presents tines 28 on which the tomatoes are impaled. The feature of the holders mounted to be turned and presenting the tines, as well as the roller supports for the holders is disclosed in my machine above referred to. In the application mentioned, an elevated table is provided and a separate coring device to act on the tomatoes when on said table. An elevated table 103 is included in the present application leading to which is a short ramp 104, both slotted longitudinally as at $24^a$.

Above said table an endless belt 106 is provided, running over sprocket wheels 107 on horizontal shafts 158 driven as described in my said application or by any other suitable means. Said belt is provided with tomato-advancing fingers 109 having broadened ends 110 curving longitudinally and transversely to engage and advance the tomatoes A, there being spurs 111 on said broadened ends to penetrate the tomatoes. Supported in fixed position below the table 103 is a rack 200, here shown as carried by brackets 201, said rack being positioned to be engaged by the pinions 89 on the traveling holders 26 for turning the revoluble body of the latter as hereinafter referred to.

The coring means and the core-controller employed are as follows: One or more coring knives 202 are provided disposed vertically and partially accommodated in vertical grooves 26$^e$ on the holder 26 at the exterior. At the lower end each knife is provided with upper and lower projections 203 between which is disposed a shift collar 204 disposed about the holder 26 outside of said knives. The holder has stud axles 205 provided with wheels 206 adapted to engage in and travel along U-shaped tracks 207 on the machine, each track being disposed vertically so that the wheels run on the lower flanges. The tracks rise toward the ramp 104 as at 207 and more abruptly than said ramp until they reach a level 207$^b$ beneath and parallel with the table 103, the arrangement serving to raise the collar 204 and therefore to raise the knives 202 relatively to the holder 26. The knives slope outwardly from the lower end to approximately the vertical center of the knives and then slope inwardly and at the widest portion they may have arcuate members 208 outside of the holder 26 to afford a broader bearing surface in the guiding of the knives in their vertical movements.

The lower portion of each knife 202 has at the inside thereof a vertical rib 202$^a$ partially accommodated in the slot 26$^d$, the lower portion of said slot as seen in Fig. 5 having an inward slope as at 26$^f$.

With the described arrangement as the wheels 206 travel upwardly on the inclines 207$^a$ of the tracks 207 and the knives 202 correspondingly rise, the engagemenet of the rib 202$^a$ on the knife with the sloping surface 26$^f$ will result in an upward and inward movement of the upper pointed end of the knife so that the knife will penetrate the tomato and make a cut corresponding with the plane of the knife, the described movement of the knife being for the purpose of producing a small cut since obviously an upward movement of the knife without its being directed laterally inward at the same time would produce a cut or laceration of the tomato to a width corresponding with the effective width of the knife as measured by the distance between two parallel lines drawn adjacent to the inner surface of the pointed upper end and adjacent to the widest portion at the member 208. Thus, the upper penetrating and cutting portion of a knife is directed laterally inward to lie in a plane disposed oblique to the axis of the holder. As the knife is raised and caused to penetrate the tomato the holder 26 will arrive at a point for its pinion 89 to engage the fixed rack 200, thereby causing a turning movement of the holder and causing the knives to describe a circle and since the entered ends of the two knives are disposed at an inclination in convergent planes the core will be cut in conical form from the tomato, the tomato with the cut core therein being carried by the fingers 109 forwardly toward the discharge chute (not shown) of the machine, so that the core may fall out as the tomatoes roll down the chute, thereby enabling the attendant to pick up the tomatoes free of the cores.

In connection with the described coring knives, I provide on the holder 26 a core-controlling element 209 disposed laterally above the top of said holder between the tines 28. Said element 209 is carried by a vertical shank 210 having at the inner side at the lower portion a rib 210$^a$ traveling in a groove 26$^g$ slidable in holder 26. Said element 209 is actuated by the collar 204, there being an upper lug 212 and a lower lug 213 on the shank 210 adapted to be engaged by said collar. The lugs 212, 213 are spaced a distance to permit the collar having initial upward movement with the knives 202 without engaging the upper lug 212, the arrangement being such that the core-controlling element will be raised after the knives have penetrated the tomato and will lie beneath the core of the tomato as the wheels 206 continue to travel along the tracks 207. The distance between the table 103 and the bed 23 is such that the tines 28 will be withdrawn from the tomato as the knives 202 penetrate the same and as the holder 26 and tines recede from the tomato, the element 209 will have arrived beneath the tomato to support the core. Upon the downward movement of the collar 204 by reason of the wheels 206 traveling down the incline 207$^c$ of the tracks 207, the knives will withdraw from the tomato leaving the severed core resting on the element 209 and adapted to be swept along the table 103 by the finger 109 as said finger rises and turns in response to the travel of the belt 106. In the downward movement of the collar 204 the initial movement will be independent of the shank 210 and as said collar approaches its lowermost position, it will engage the lower lug 203 of said shank and restore the element 209 to its original lowered position. To give guided vertical movement to the collar 204 without turning suitable guide means may be provided, there being indicated a standard 214 rigid with the base 26$^d$ of spindle 26$^a$ and disposed in a slot 215 in a bracket 216 on said collar. The shank 210 may have an additional guide means in the form of an arcuate element 217 thereon at the outside of the holder 26.

The tines 28 may have at the inner sides strengthening ribs 28$^a$.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. In a machine of the class described, a traveling carrier, holders on said carrier adapted to receive the articles to be cored, coring means on said holders, and means to actuate said coring means.

2. In a machine of the class described, a traveling carrier, holders on said carrier adapted to receive the articles to be cored, a coring knife on each holder, means to cause a movement of said knife on the holder for penetrating the article carried by the holder, and means to give rotary movement to said knife.

3. In a machine of the class described, a traveling carrier, holders on said carrier adapted to receive the articles to be cored, a table elevated above the normal plane of travel of the articles, means independent of said carrier to advance the articles along said table, a coring means carried by the holders, and means to actuate said coring means during the movement of the articles over said table.

4. In a machine of the class described, a traveling carrier, holders on said carrier adapted to receive the articles to be cored, coring knives on the holders mounted for movement thereon toward and from the support articles for penetration of the articles and withdrawal of the knives therefrom, means to revolve the holders and knives after the knives have penetrated the articles, said last-mentioned means including an element on each holder, and a relatively fixed element in the path of movement of said element to engage and turn the same.

5. In a machine of the class described, a traveling carrier, holders on said carrier adapted to receive the articles to be cored, coring means on said holders, and means to actuate said coring means; together with a core-controlling element on each holder and movable to and from a position for supporting the core with the penetrating and withdrawal movements of the knives.

6. In a machine of the class described, a traveling carrier, holders on said carrier adapted to receive the articles to be cored, coring knives on the holders and movable thereon toward and from the supported articles, elements movable on the holders and carrying said knives, core-controlling elements on the holders movable toward and from a position to support the severed cores, and means to actuate said movable elements; said movable elements and the knives moved thereby having a limited movement on the holders independently of the core-controlling elements to move said knives and said core controlling elements in succession toward and from the supported articles.

7. In a peeling machine of the class described, a traveling carrier, holders on said carrier adapted to receive the articles to be cored, a table elevated above the normal plane of travel of the articles, coring knives on said holders and movable thereon toward or from the supported article for penetration of the latter and withdrawal therefrom, means movable on the holders and carrying said knives, and a relatively fixed actuating track in the path of movement of said last-mentioned means for engaging the same, said track having directions to successively move the knives to cutting position and withdraw them from the cutting position.

8. In a peeling machine of the class described, a traveling carrier, holders on said carrier adapted to receive the articles to be cored, a table elevated above the normal plane of travel of the articles, coring knives on said holders and movable thereon toward or from the supported article for penetration of the latter and withdrawal therefrom, means movable on the holders and carrying said knives, and coacting means on the element carrying the knives and on a relatively fixed part of the holder to guide said element in its said movements.

9. In a machine of the class described, a traveling carrier, holders on said carrier adapted to receive the article to be cored, a coring knife on said holder and movable thereon to a cutting position and withdrawal from the cutting position, and means to actuate said knife to move into cutting position in a direction corresponding with its own plane.

10. In a machine of the class described, a traveling carrier, holders on said carrier adapted to receive the articles to be cored, coring knives movable on said holders, means to move said knives longitudinally on the holders toward or from the supported articles for penetrating the latter and for withdrawal from the penetrating position, and means to cause the knives to move laterally inward as they are moved longitudinally.

11. In a machine of the class described, a traveling carrier, holders on said carrier adapted to receive the articles to be cored, coring knives movable on said holders, the forward cutting portions of said knives being directed laterally inward to lie in planes oblique to the general paths of movement of the knives, means to move said knives longitudinally on the holders toward and from cutting position, and means to cause a movement of the cutting portions of the knives laterally inward and laterally outward in succession as they move longitudinally on the holders.

12. In a machine of the class described, a traveling carrier, holders on said carrier adapted to receive the articles to be cored, coring means on said holders, means to actuate said coring means, and a traveling series of holding elements positioned to engage the article during the operation of said coring means.

CHARLES KIRINO.